United States Patent [19]
Sato et al.

[11] Patent Number: 4,908,646
[45] Date of Patent: Mar. 13, 1990

[54] RANGE MEASURING DEVICE FOR CAMERA

[75] Inventors: Shigemasa Sato; Akira Katayama; Hiroshi Terunuma, all of Tokyo, Japan

[73] Assignee: Nikon Corporation, Tokyo, Japan

[21] Appl. No.: 204,905

[22] Filed: Jun. 10, 1988

[30] Foreign Application Priority Data

Jun. 15, 1987 [JP] Japan .................. 62-148603
Apr. 5, 1988 [JP] Japan .................. 63-084358

[51] Int. Cl.$^4$ .............................................. G03B 3/00
[52] U.S. Cl. ................................ 354/402; 354/432; 354/403
[58] Field of Search ................ 354/400, 402, 403, 432

[56] References Cited

U.S. PATENT DOCUMENTS

4,591,257 5/1986 Sawano ........................... 354/403
4,740,806 4/1988 Takehana ....................... 354/403

*Primary Examiner*—Russell E. Adams
*Attorney, Agent, or Firm*—Shapiro and Shapiro

[57] ABSTRACT

Range measuring device for a camera measures the distances to objects respectively present in a central area of the photographing field and in plural areas including those surrounding the central area, then produces an outdoor signal indicating that the photographing is conducted outdoors or an indoor signal indicating that the photographing is conducted indoors, discriminates whether the object in the central area is the main object to be focused from the measured distance of the central area, and, if the distance in the central area is included in a reference distance range, determines the photographing distance based at least on the measured distance of the central area. The reference distance range is selected to be larger when the outdoor signal is produced than the case when the indoor signal is produced.

15 Claims, 8 Drawing Sheets

RANGE MEASURING DEVICE FOR CAMERA

BACKGROUND OF THE INVENTION

1. Field of the Invention

The present invention relates to a multi-point range measuring system for determining the distance of photographing based on range measuring information in plural directions, and more particularly to an automatic focusing device of a camera employing multi-point range measuring system.

2. Related Background Art

For the purpose of focusing to a main object without a cumbersome operation such as focus locking even when the main object is not positioned at the center of the field to be photographed, there is known a camera employing a multi-point range measuring system, in which range measurement is conducted on plural areas to obtain plural range information, and the photographing distance is determined from the range information. Japanese Patent Application Laid-open No. 59-143914 discloses an active type range measuring device in which there are defined plural range measuring areas uniformly distributed in a plane of a predetermined size perpendicular to the direction of distance, and light from plural light-emitting elements is time-sequentially directed to the plural range measuring areas to receive reflected light with a light-receiving element.

For the purpose of reducing the size of range measuring areas of the above-explained range measuring device and also reducing the size of the light emitting elements and light receiving elements thereof, there are already known the following devices.

Figure 1A:
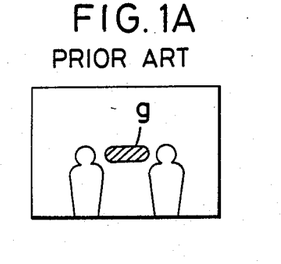
FIGS. 1A, 1B, 2 and 3 are schematic views showing conventional range measuring areas.
Figure 2:
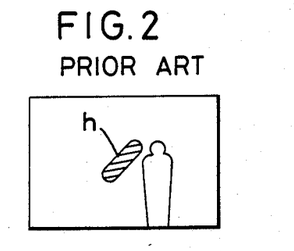
Figure 3:
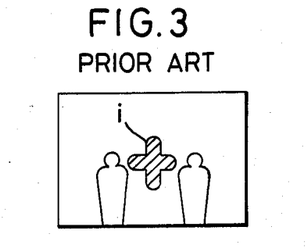

U.S. Pat. Nos. 4,371,261, 4,534,636 and 4,575,211 disclosure a range measuring area g extended, as shown in FIG. 1, along a side of the photographing field and positioned at the center thereof, or a range measuring area h extended diagonally at the center of the photographing field as shown in FIG. 2. Also Japanese Patent Application Laid-open No. 61-246613 discloses a cross-shaped range measuring area i as shown in FIG. 3.

The arrangement and shape of such range measuring areas are devised to more securely catch the main object in the range measuring area, thereby reducing error in the range measurement for the main object. More specifically said arrangement and shape are selected because a higher probability of catching the main object is achieved by a range measurement in an area having a certain length in the vertical and/or horizontal direction of the photographing field, in comparison with the measurement at a point in the center of the field.

Figure 1B:
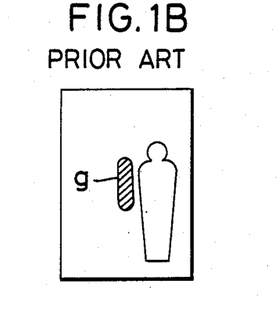

However such conventional range measuring areas have not been determined in consideration of the specific contour of persons as the object. Consequently, in photographing two persons for example, there may occur a case in which the range measuring area g or i is positioned between the faces of two persons as shown in FIGS. 1A and 3, so that the photograph is focused to the background. Also if the photographing field is selected vertically oblong and a person is positioned out of the center of the photographing field as shown in FIG. 1B, the laterally elongated range measuring area explained above becomes ineffective.

Also the diagonal range measuring area h may not cover the person if the person is displaced in an inappropriate direction from the center of the photographing field as shown in FIG. 2.

For determining a photographing distance from plural range information obtained from range measurements of plural areas, there are already known various systems, including:

a system of selecting, among plural range information, the range information of a closest object as the photographing distance;

a system of determining a weighted average range of the objects in the central area of the photographing field and determining the photographing distance from the average range; and a system of controlling the lens position and the diaphragm aperture in such a manner that the closest object and the farthest object are contained in the depth of focus. With respect to the positional relationship of the objects in the photographing field, the main object is often distant considerably from the background object such as wall, woods or mountain in case of outdoor photographing such as in a park or in a sight-seeing spot, but, in indoor photographing such as in an ordinary house, the main object is often close to other surrounding objects such as a wall, window or small articles. Also the distance between the main object and the photographer is generally shorter indoors than outdoors.

However, in the conventional multi-point range measuring system, the photographing distance of the photographing lens is determined without distinction between the indoor and outdoor conditions, so that appropriate focusing is not always obtained.

SUMMARY OF THE INVENTION

A principal object of the present invention is to provide a range measuring device for use in a camera, capable of securer measurement of the range to the main object.

According to the present invention, the range measuring area is so selected as to cover three positions respectively corresponding to the vertexes of a triangle of a predetermined size, of which one of said vertexes is positioned at the approximate center of a rectangular photographing field.

Another object of the present invention is to provide an automatic focusing device capable of appropriately varying the method for determining the photographing distance according to whether the photographing is conducted indoors or outdoors.

The automatic focusing device of the present invention measures the distances to the objects respectively present in a central area of the photographing field and in plural areas including those surrounding said central area, then produces an outdoor signal indicating that the photographing is conducted outdoors or an indoor signal indicating that the photographing is conducted indoors, discriminates whether the object in the central area is the main object to be focused from the measuring distance of said central area, and, if the distance in the central area is included in a reference distance range, determines said photographing distance based at least on the measured distance of said central area. The reference distance range is selected to be larger when said outdoor signal is produced than the case when said indoor signal is produced.

DESCRIPTION OF THE PREFERRED EMBODIMENTS

Figure 4:
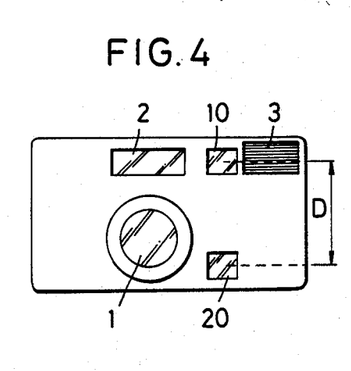
FIG. 4 is a front view of a camera embodying the present invention.
Figure 6:
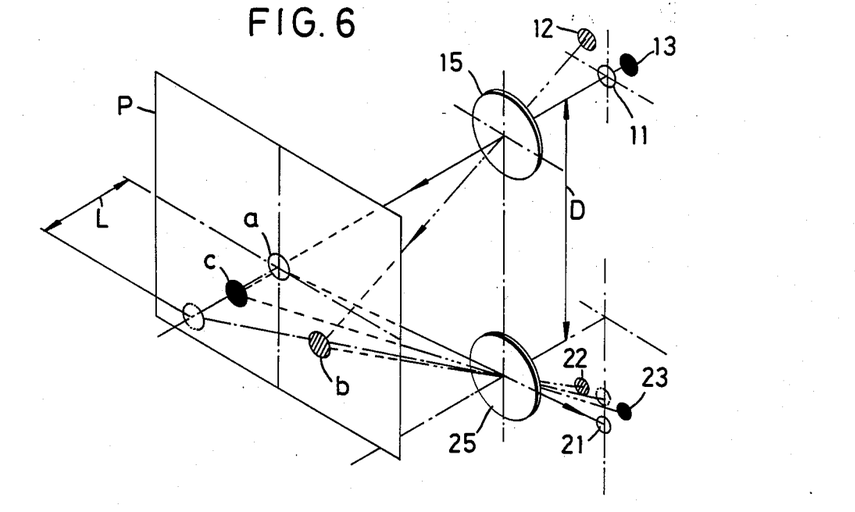
FIG. 6 is a schematic view showing the relationship of a light-emitting element, a light-receiving element and range measuring areas.

As shown in FIG. 4, there is provided a view finder 2 above a photographing lens 1 in a camera housing; a light-emitting unit 10 positioned between the view finder 2 and a flash window 3 of a flash unit; and a light receiving unit 20 positioned below the light emitting unit 10 and separated therefrom by a base line length D. As shown in FIG. 6, the light emitting unit 10 is composed of three light-emitting elements 11, 12, 13 with a lens 15 positioned in front. The light receiving unit 20 is composed of light receiving elements positioned behind a light receiving lens 25.

Figure 5:
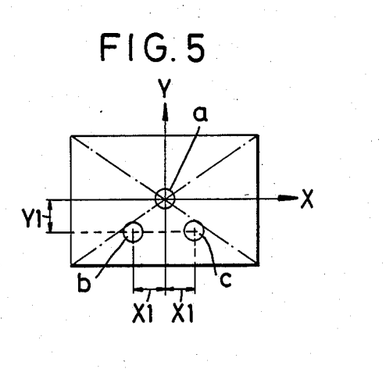
FIG. 5 is a schematic view of range measuring areas.

As shown in FIGS. 5 and 6 in the photographing field P extending perpendicularly to the direction of range measurement, said light emitting elements and light receiving elements define three range measuring areas, of which an area a is positioned at the center while other areas b,c are positioned diagonally below said area a.

The distance x1 corresponds to 1/10 to 1/5 of the horizontal angle of view, while the distance y1 corresponds to 1/10 to 1/5 of the vertical angle of view. The horizontal and vertical angles of view are defined in the following manner. A plane perpendicular to the optical axis is formed at the focal point of the photographing lens, and an actual photographing area (in case of so-called 35 mm format, a rectangular area with a vertical length of 24 mm and a lateral length of 36 mm with the focal point at the center) is defined in said perpendicular plane. The vertical angle of view is defined by the angle between lines connecting the center of the photographing lens with points 12 mm above and below the focal point on said plane. Also the horizontal angle of view is defined by the angle between lines connecting the center of the lens with points 18 mm at the right and left of the focal point on said plane.

The three light-emitting elements 11, 12 and 13 may be activated in three directions simultaneously, or time-sequentially, but the method of activation can be selected suitably according to the characteristics of said elements.

Figure 7:
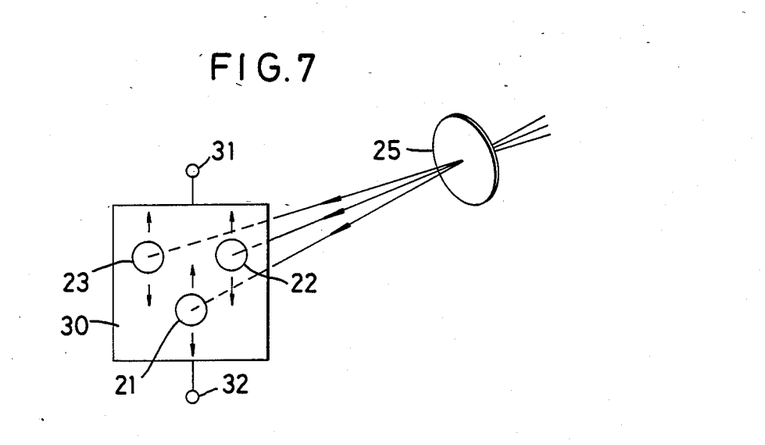
FIG. 7 is a view showing light spots on the light-receiving element.

The light beams reflected in the range measuring areas a, b, c enter the light receiving element 30 through the light receiving lens 25, thus forming light spots 21, 22, 23 as shown in FIG. 7. The light spots move vertically on the light receiving element 30, depending on the ranges of objects in respective directions. In the present embodiment a light spot moves upwards or downwards if the object is farther or closer.

The light spots 21, 22, 23 on the light receiving element 30 shown in FIG. 7 represent a case in which the light beams are reflected by objects of the same distance. If the light receiving element 30 is composed of a position sensing device (PSD), the distance of the objects in respective directions can be determined by the relative intensities of electric currents $I_1$, $I_2$ generated from output terminals 31, 32 of the light receiving element 30.

Figure 8:
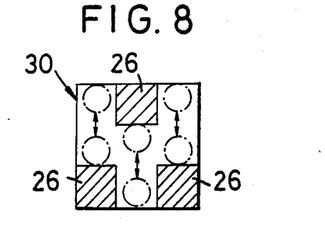
FIGS. 8, 9, 10 and 11 are front views showing variations of the light-receiving element.

The light receiving element 30 is not limited to such PSD but can be composed of a so-called position detecting element. The non-irradiated portion of the element 30 is preferably covered with an aluminum film 26 or the like (FIGS. 8, 10, and 11) in order to prevent the influence of noise caused by stray light.

In the use of the light-receiving element 30 explained above, it is necessary to activate the light-emitting elements 11, 12, 13 sequentially, for example to activate the element 11 at first and then the elements 12, 13.

The terminals 31, 32 of the light receiving element 30 are respectively connected to known calculating circuits (not shown), which time-sequentially process the output currents $I_1$, $I_2$ from the light receiving element. In such processing it is possible to process three outputs independently, or to give emphasis to the output from the central light spot and to handle the outputs corresponding to the light spots 22, 23 as auxiliary signals. Also the outputs may be processed simltaneously.

Figure 9:
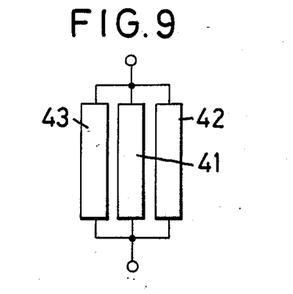

As a variation of the light receiving element, three PSD's 41, 42, 43 may be provided in parallel manner as shown in FIG. 9.

Figure 10:
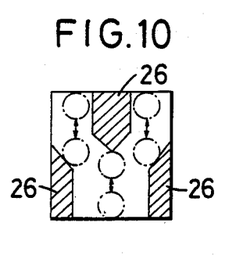

Also it is possible, as shown in FIG. 10, to maintain the area of the light receiving face of the light receiving element constant, thereby causing a linear movement in the received beams and improving the precision of distance measurement.

Figure 11:
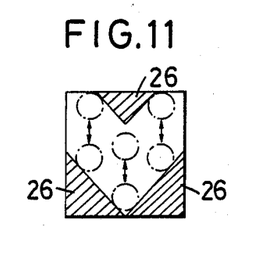

Also if a V-shaped continuous range measuring area is employed, the light receiving element should preferably have a correspondingly V-shaped light receiving face as shown in FIG. 11.

Figure 12:
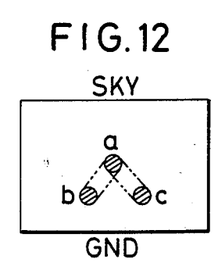
FIGS. 12, 13, 14, 15 and 16 are schematic views showing the range measuring areas.
Figure 13:
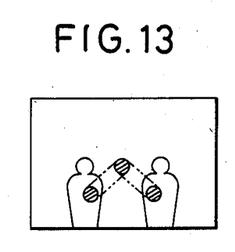
Figure 14:
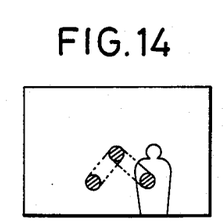

When the light-emitting unit and the light receiving unit are constructed as explained above, and when the camera is positioned horizontally oblong, the range measuring areas a, b, c are positioned as shown in FIG. 12. If two persons are present side by side in the photographing field, the range measuring areas b, c cover the laterally wide portions (shoulders) of the persons as shown in FIG. 13. Also, if a person is present out of center in the photographing field, the area c covers the shoulder portion of the person as shown in FIG. 14.

Figure 15:
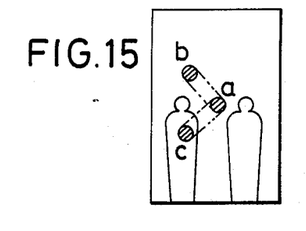

If the camera is positioned vertically oblong, the flash window 3 is generally positioned upwards, in order to prevent the flash window in order to prevent the flash window 3 being covered by a hand, and to prevent a shadow of the object appearing above the object by the flash illumination. Consequently the photographing field rotates clockwise, and the range measuring areas a, b, c are positioned as shown in FIG. 15. If two persons are positioned side by side in the field in this state, the range measuring area c at the left bottom position covers the shoulder portion of the person at left.

Figure 16:
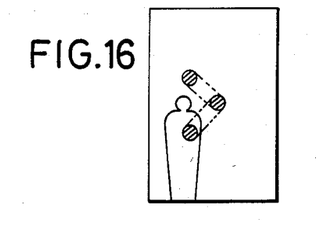

Also in case a background is positioned at the center of the field and a person is placed out of the center of the field, the range measuring area c can cover the shoulder portion of the person by placing the person at the left side as shown in FIG. 16.

Figure 17:
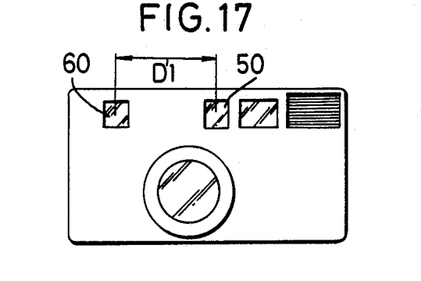
FIG. 17 is a front view of a camera constituting another embodiment of the present invention.
Figure 18:
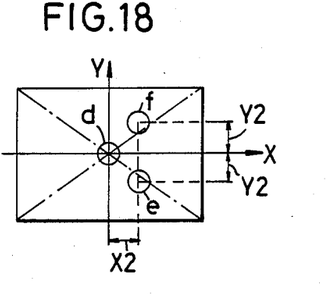
FIG. 18 is a schematic view showing range measuring areas.
Figure 19:
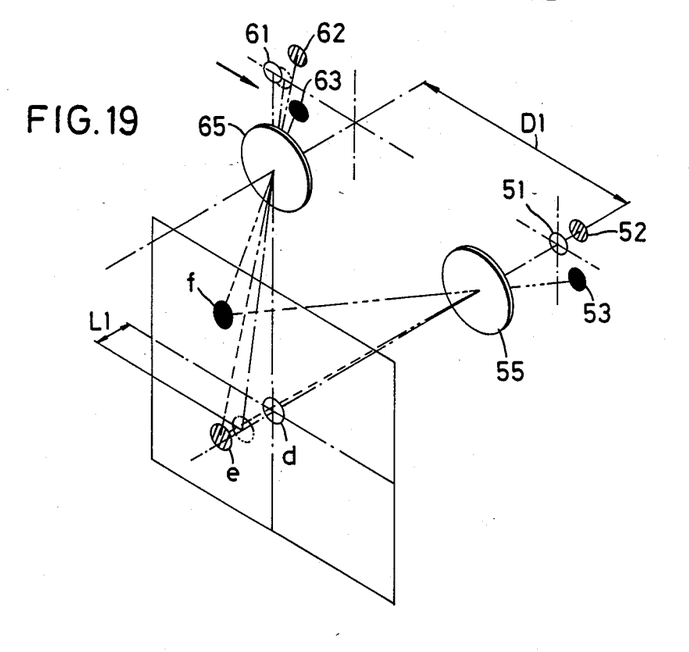
FIG. 19 is a schematic view showing relationship of a light-emitting element, a light-receiving element and range measuring areas.
Figure 20:
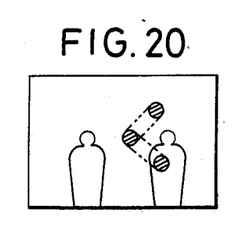
FIGS. 20, 21, 22 and 23 are schematic views of range measuring areas.
Figure 21:
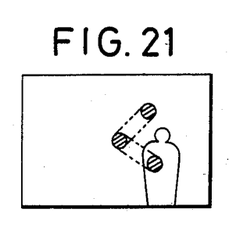
Figure 22:
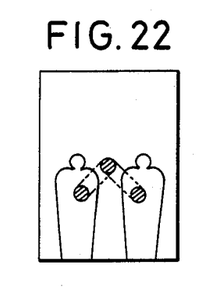
Figure 23:
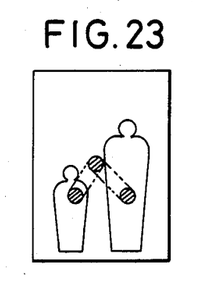

FIGS. 17 to 19 illustrate another embodiment, in which a light emitting unit 50 composed of light emitting elements 51, 52, 53 and a lens 55, and a light receiving unit 60 composed of a light receiving element and a light receiving lens 65 are positioned with a horizontal base line length D1. Thus a range measuring area d is defined at the center. Since the flash window of the flash unit is positioned at the top when the camera is used in the vertically oblong position, the range measuring areas e, f are positioned diagonally upwards and downwards at the right of the range measuring area d. When the range measuring area d moves farther away by a distance L1 from the photographic lens, a light spot 61 shown in FIG. 19 (one of light spots 61-63 formed by reflected light) moves, on the light receiving element, in a direction indicated by an arrow.

FIGS. 20 to 23 illustrate the relationship between the object and the range measuring areas d, e, f in the present embodiment. It will be understood that the main object is adequately covered by the range measuring areas regardless of whether the photographing field is vertically or horizontally oblong.

An active range measuring device is employed in the foregoing embodiments, but they are naturally applicable to a passive range measuring device or a TTL range measuring device.

Also there have been employed point-shaped range measuring areas a-f, but it is also possible to employ a V-shaped continuous area which has plural points on each of substantially perpendicular two sides.

In the following there will be explained an embodiment of automatic focusing device utilizing the range measuring method explained above.

Figure 24:
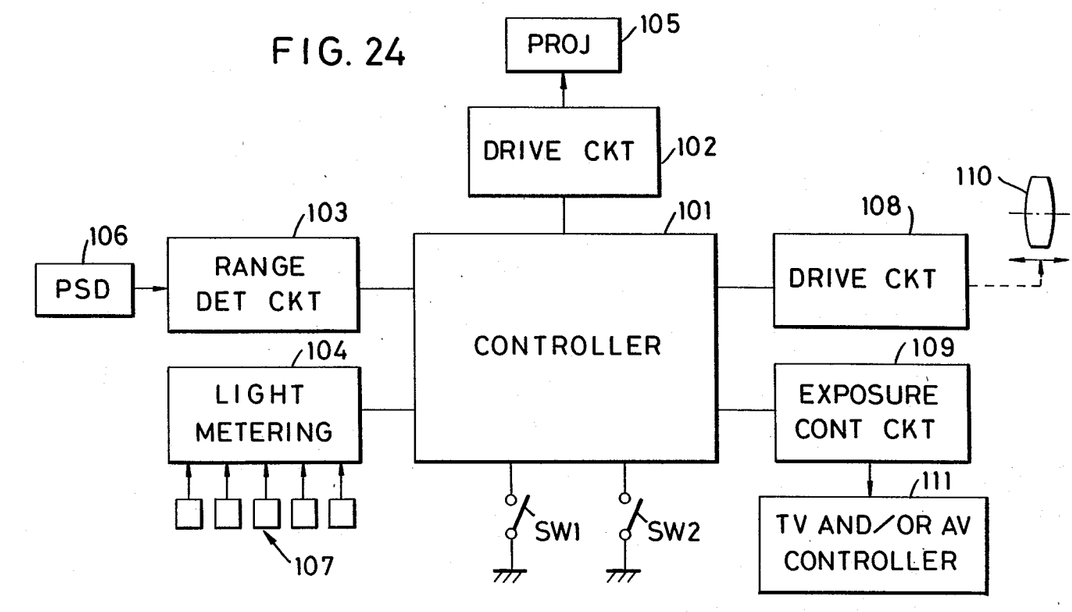
FIG. 24 is a block diagram of an automatic focusing device embodying the present invention.
Figure 25:
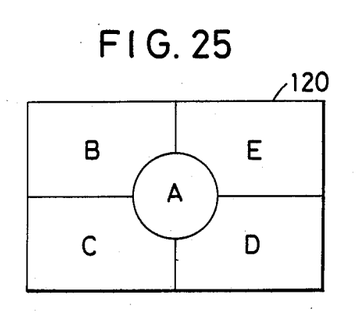
FIG. 25 is a view showing light metering areas.

In FIG. 24, a control circuit 101 composed of a CPU, a ROM, a RAM etc. is connected to a light source driving circuit 102, a range determination circuit 103, and a light metering circuit 104. The light source driving circuit 102 causes the light-projecting unit 105 to emit light beams toward the object in response to an instruction from the CPU. The range measuring circuit 103 conducts range measurements at a central area a of the photographing field and two peripheral areas b, c as shown in FIG. 5, and is connected to a light receiving element 106 for receiving the light beams emitted from the light emitting unit 105 toward the objects in the areas a-c and reflected by the objects. The light metering circuit 104 measures the light intensity in each of five areas A-E obtained by dividing the photographing field 120 as shown in FIG. 25, and is provided with five light receiving elements 107 corresponding to areas A-E.

The control circuit 101 is also connected to a lens driving circuit 108 and an exposure control circuit 109 for respectively controlling a photographing lens 110 and an exposure control member 111, which is composed of a shutter and a diaphragm.

The control circuit 101 is further connected to switches SW1, SW2 linked with the actuation of a shutter release button (not shown). The switch SW1 is closed when the shutter release button is partially depressed over a first stroke, and the switch SW2 is closed when the shutter release button is completely depressed over a second stroke. The control circuit controls various circuits in response to the input signals from switches SW1, SW2.

The CPU discriminates whether the photographing is to be conducted outdoors or indoors from the light metering data obtained from the areas A-E of the photographing field, and changes the method of determining the photographing distance according to the result of the discrimination. The discrimination of indoor or outdoor photographing can be made, for example by either of the following two methods, according to the light metering data from the light receiving elements 107 corresponding to the areas A-E:

(1) An outdoor condition is identified if the average $Ev_{mean}$ of the luminosity data Ev obtained from the light metering data in the areas A-E is equal to or larger than $Ev=9$, and an indoor condition is identified if the average $Ev_{mean}$ is smaller than $Ev=9$;

(2) An outdoor condition is identified if the luminosity is high at a pair of areas B and C, or C and E, or B and D, and an indoor condition is identified if such high luminosity is not found.

The above-explained methods 1 and 2 may be employed in combination. It is also possible to measure the color temperature of the object field and to identify an outdoor condition if the color temperature corresponds to natural light, or an indoor condition if it corresponds to artificial illumination such as a fluorescent lamp. This method can be easily achieved with a color temperature sensor. Also an outdoor condition may be identified if one of multiple range measurements indicates an infinite distance.

Figure 26:
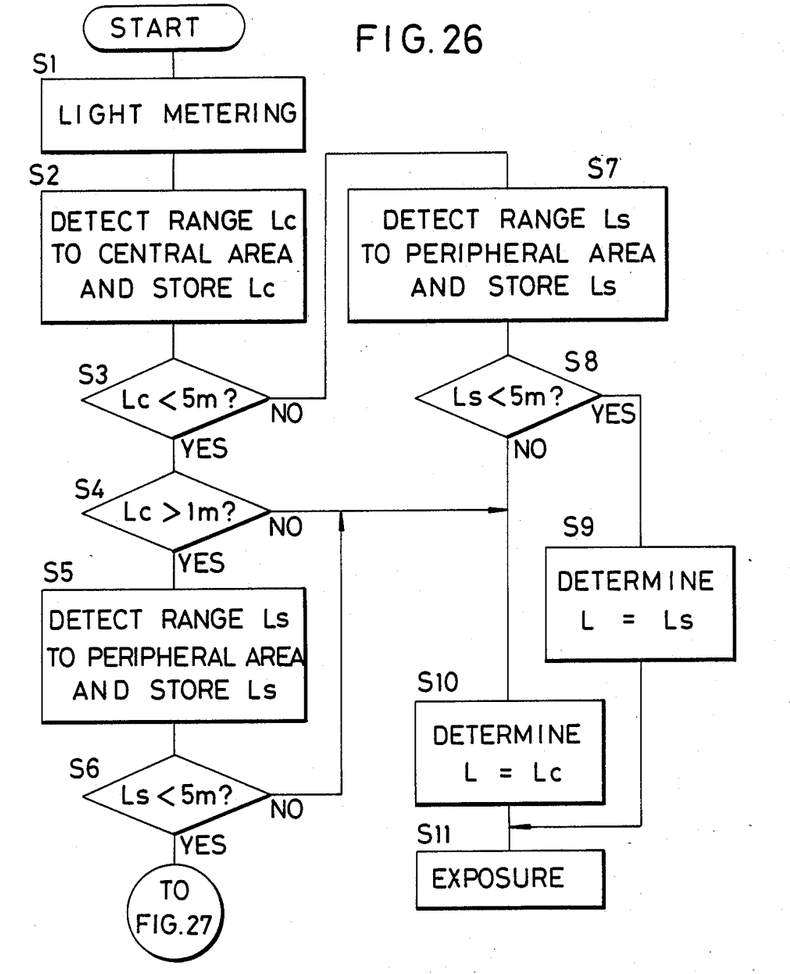
FIGS. 26 and 27 are flow charts showing the control sequence of the present invention.

In the following there will be explained the procedure from the light metering to the photographing operation, with reference to flow charts shown in FIGS. 26 and 27.

When the switch SW1 is closed, a step S1 executes light metering, in which luminosity values $EV_A$-$EV_E$ of the five areas A-E of the object field are calculated by the light metering circuit 104 based on the detection signals from the light receiving elements 107 respectively corresponding to those areas, and are stored in the RAM of the controller 101.

Then a step S2 executes range measurement of the central area a of the object field. The control circuit 101 activates the light emitting unit 105 through the light source driving circuit 102, thereby emitting light toward the object in the central area. The reflected light from the object is received by the light receiving unit 106, and a detection signal is supplied to the range determination circuit 103. The detection signal is converted into a voltage, which is supplied to the control circuit 101 and stored, as the central area range Lc, in the RAM.

A step S3 discriminates whether the distance to the object in the central area is equal to or less than 5 m, and, if the distance is larger than 5 m, the sequence proceeds to a step S7 for conducting range measurements in the peripheral areas b, c in the same manner to obtain ranges $L_{s1}$, $L_{s2}$, of which the average $L_s$ is stored in the RAM. Then a step S8 discriminates whether the distance to the object in the peripheral areas is equal to or less than 5 m. If the distance is equal to or less than 5 m, a step S9 determines the distance Ls measured in the peripheral areas as the photographing distance L of the photographing lens, and a step S11 executes the photographing operation. On the other hand, if the result in the step S8 is negative, namely if the distance to the object in the peripheral areas is larger than 5 m, a step S10 selects the distance Lc in the central area as the photographing distance L, and the step S11 executes the photographing operation.

On the other hand, if the step S3 identifies that the measured distance Lc of the central area is equal to or smaller than 5 m, the sequence proceeds to a step S4 to discriminate whether the measured distance Lc is equal to or larger than 1 m. If it is smaller than 1 m, the sequence proceeds to the step S10 to select the measured distance Lc as the photographing distance L, and the step S11 executes the photographing operation.

In this manner, if the distance Lc measured in the central area is less than 1 m, the photographing operation is conducted with the measured distance Lc without conducting the ranges of the objects in the peripheral areas. The distance of 1 m is not limitative and can be arbitrarily changed to a suitable short distance.

If the step S4 identifies that the measured distance in the central area is equal to or larger than 1 m, the sequence proceeds to a step S5 for measuring the ranges of the objects in the peripheral areas as in the step S7 and storing an average as the distance Ls of the peripheral areas in the RAM. Then a step S6 discriminates whether the distance Ls is equal to or smaller than 5 m, and, if it is larger than 5 m, the step S10 determines the distance Lc as the photographing distance L. Then the photographing operation is conducted in the step S11.

Figure 27:
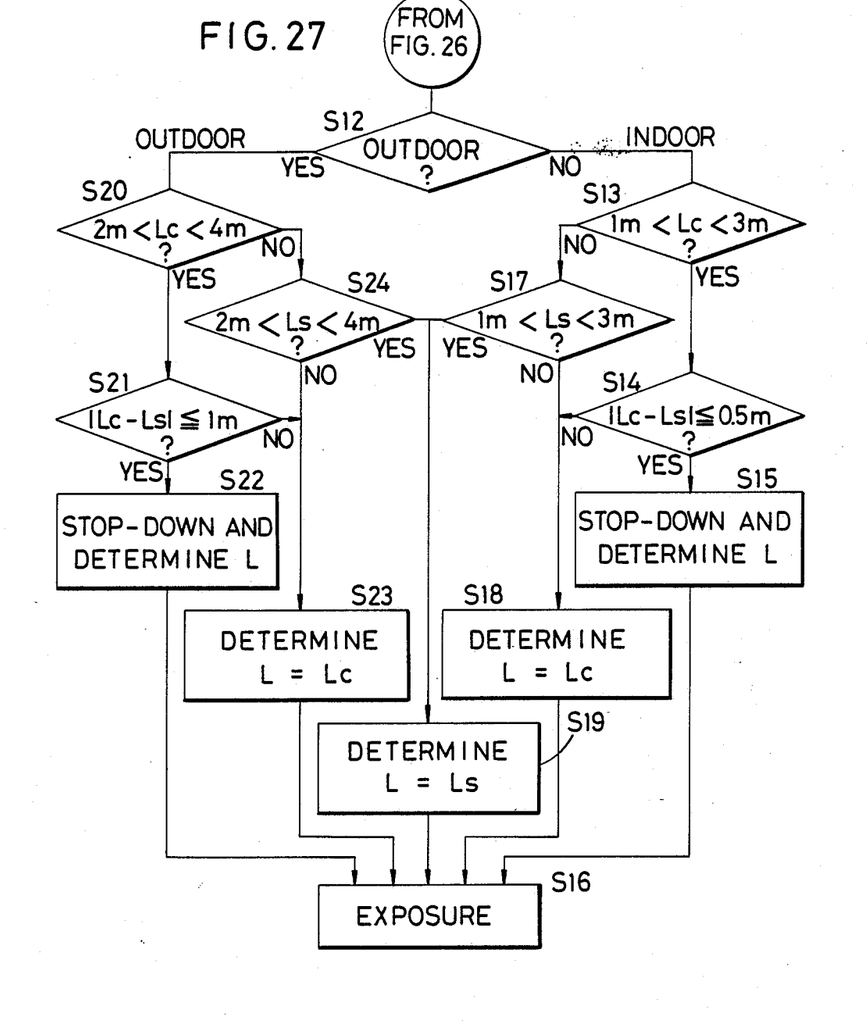

If the discrimination of the step S6 is equal to or less than 5 m, namely if the measured range Lc of the central area and the measured range Ls of the peripheral areas both do not exceed 5 m, the sequence proceeds to a step S12 shown in FIG. 27, for discriminating whether the photographing is conducted indoors or outdoors, based on the above-mentioned luminosity values $EV_A$--$EV_E$. In case of an indoor condition, a step S13 discriminates whether the measured distance Lc of the central area is within a range from 1 m to 3 m. This distance range is the reference distance range for identifying whether the object in the central area is the main object to be focused.

If the measured distance Lc of the central area is within a range from 1 m to 3 m, the sequence proceeds to a step S14 for discriminating whether the distance between the object in the central area and that in the peripheral areas is within 50 cm. If the distance is within 50 cm, a step S15 decreases the diaphragm aperture to expand the depth of focus within an extent of obtaining appropriate exposure, and selects the photographing distance L in such a manner that the measured distance Lc of the central area and that Ls of the peripheral areas are both included in the depth of focus, or that the distance L is positioned between the measured distance Lc of the central area and that Ls of the peripheral areas and the measured distance Lc of the central area is included in the depth of focus. Then the photographing operation is conducted in a step S16. The diaphragm aperture determined in in a step S16. The diaphragm aperture determined in the step S15 is so selected as to obtain a shutter speed not causing vibration of the camera. On the other hand, if the step S14 identifies that the distance between the object in the central area and that in the peripheral areas exceeds 50 cm, a step S18 selects the measured distance Lc as the photographing distance L.

If the step S13 identifies that the measured distance Lc of the central area is not within the range from 1 m to 3 m, a step S17 discriminates whether the object in the peripheral areas is within a range from 1 m to 3 m, and, if not, the step S18 determines the measured distance lc as the photographing distance L. On the other hand, if the discrimination in the step S18 is affirmative, a step S19 determines the measured distance Ls of the peripheral areas as the photographing distance L.

On the other hand, when the step S12 identifies an outdoor condition, a step S20 discriminates whether the object in the central area is within a range from 2 m to 4 m. This distance range is the reference distance range for discriminating whether the object in the central area is the main object to be focused. If the discrimination is affirmative, a step S21 discriminates whether the distance between the object in the central area and that in the peripheral areas is within 1 m, and, if affirmative, the sequence proceeds to a step S22.

The step S22 decreases the diaphragm aperture to widen the depth of focus within an extent of obtaining an appropriate exposure, and determines the photographing distance L in such a manner that the measured distance Lc of the central area and that Ls of the peripheral areas are both contained in the depth field of focus or that the photographing distance L is between the measured distance Lc of the central area and that Ls of the peripheral areas and the measured distance Lc is included in the depth field of focus. Then the photographing operation is conducted in the step S16. The diaphragm aperture determined in the step S22 is selected in such a manner as to obtain a shutter speed not causing vibration of the camera.

If the step S21 identifies that the distance of the objects is larger than 1 m, a step S23 determines the measured distance Lc as the photographing distance L.

If the step S20 identifies that the measured distance Lc of the central area is not within the range from 2 m to 4 m, a step S24 discriminates whether the measured distance Ls of the peripheral areas is within a range from 2 m to 4 m, and, if negative, the step S23 determines the measured distance Ls as the photographing distance L.

When the step S14 or S21 discriminates that the distance between the object in the central area and that in the peripheral areas is within 50 cm or 1 m, the sequence may be so constructed as to proceed to the step S18 or S23 for determining the measured distance Lc of the central area as the photographing distance L. Also the above-mentioned distance is not limited to 50 cm or 1 m but can be arbitrarily selected at a relatively small distance between the objects in the central and peripheral areas. The distance value for outdoor condition is selected larger than that for indoor condition, because, in outdoor photographing, the diaphragm aperture is made smaller for higher luminosity of the object.

Also the positional relationship between the object in the central area and that in the peripheral areas may be determined from the ratio of distances thereof. In such case the ratio is selected larger in outdoor condition than in indoor condition. Also the reference ranges are selected as 1-3 m and 2-4 m respectively in the indoor and outdoor conditions, but these figures are not limitative as long as the longer distance limit of said range for the outdoor condition is larger than that for the indoor condition.

As explained in the foregoing, the steps S13 and S14 in the indoor photographing or the steps S20 and S21 in the outdoor photographing realize focusing with priority to the object in the central area if it is within a reference distance range.

The arrangement of the points of range measurement is not limited to that shown in FIG. 5 but may assume any form as long as the range measurements can be conducted in plural areas in the photographing field. Also the values used for determining the photographing distance are not limited to the measured distance Lc of the central area and the average measured distance Ls of the peripheral areas employed in the foregoing embodiments, but can be, for example, independent information obtained from plural areas, or locally averaged values, as long as they represent plural data of range measurements.

In the foregoing embodiments the indoor and outdoor conditions are automatically discriminated by the camera, but it is also possible to supply an out-door signal or an indoor signal with a manual switch.

In case of photographing an object field in which a low shrub is present in front of the main object, as in an outdoor park, the automatic focusing device of the foregoing embodiment selects the object in the central area as the main object and determines the photographing distance accordingly if the object is within a range from 2 m to 4 m. Therefore, there is obtained a higher probability of focusing to the object person constituting the main object.

Also in indoor photographing, if a person is positioned beyond a table with a flower on it, the shutter speed becomes slower, giving a higher possibility of camera vibration if the depth of focus is made large enough to include both the person and the flower. However, in the foregoing embodiment, in case of indoor photographing, the photographing distance is determined in consideration of the depth field of focus only in case the distance between the object in the central area and that in the peripheral areas is within 0.5 m, but is selected equal to the measured distance in the central area if the distance between the objects exceeds 0.5 m. Thus the diaphragm aperture is not decreased extremely in considering the depth field of focus and the shutter speed is limited to a value not causing vibration of the camera. In this manner the problem of camera vibration can be avoided.

What is claimed is:

1. A range measuring device for use in a camera, comprising:
   means for measuring the distance to an object in a predetermined area in the object field;
   location detecting means for discriminating whether the object field is indoors or outdoors and generating respectively an indoor signal or an outdoor signal;
   means for comparing the distance to said object with a first reference distance in response to said outdoor signal, or with a second reference distance, shorter than said first reference distance, in response to said indoor signal; and
   means for determining the distance to said object field in response to the results of said distance measuring means and said comparing means.

2. A device according to claim 1, wherein said distance measuring means is adapted to measure respectively the distances to objects in plural areas, including a central area, of said object field, and said comparing means is adapted to compare the distance to the object in said central area.

3. A device according to claim 2, wherein said determining means is adapted to select the distance to the object in said central area, when said distance to the object in said central area is identified smaller than said first reference distance or smaller than said second reference distance by said comparing means.

4. A range measuring device for use in a camera, comprising:
   light receiving means for receiving light principally from first, second and third areas discretely distributed in a rectangular object field, respectively, said first area including approximate center of said rectangular object field, said second area being positioned apart from said approximate center by a predetermined distance in a direction of a first diagonal line of said rectangular object field at one side thereof, and said third area being positioned apart from said approximate center by a predetermined distance in a direction of a second diagonal line of said rectangular object field at the same side thereof, said second diagonal line intersecting said first diagonal line, and said light receiving means generating first, second and third outputs corresponding to said light from first, second and third areas, respectively; and
   means for determining a distance to said object field on the basis of said first, second and third outputs.

5. A device according to claim 4, wherein said second and third areas are separated from each other by a distance corresponding to 1/10 to 1/5 of an angle of view from said camera.

6. A device according to claim 4, wherein said determining means determines said distance on the basis of only said first, second and third outputs.

7. A device according to claim 4, further comprising means for emitting light beams respectively toward said first, second and third areas.

8. A device according to claim 4, wherein said light receiving means comprises a light receiving unit provided with a light receiving surface and an optical member for forming light spots from light coming from said first, second and third areas on said light receiving surface, wherein said light receiving unit generates electric outputs corresponding to the positions of said light spots on said light receiving surface.

9. A range measuring device for use in a camera, comprising:
   means for measuring a distance to a first area including approximate center of a rectangular object field and producing a first measuring output;
   means for measuring a distance to a second area positioned apart from said approximate center by a predetermined distance in a direction of a first diagonal line of said rectangular object field and producing a second measuring output;
   means for measuring a distance to a third area positioned apart from said approximate center by a predetermined distance in a direction of a second diagonal line of said rectangular object field intersecting said first diagonal line, and producing a third measuring output;
   said first, second and third areas being discretely distributed in said object field; and
   means for determining a distance to said object field on the basis of said first, second and third measuring outputs.

10. A device according to claim 9, wherein said second and third areas are located at the same side of said object field relative to said approximate center.

11. A device according to claim 9, wherein said determining means evaluates said first, second and third measuring outputs and selects at least one of said first, second and third measuring outputs.

12. A device according to claim 9, wherein said determining means evaluates said first output to determine said distance to said object field, and successively evaluates said second and third outputs.

13. A device according to claim 9, wherein said determining means includes location discriminating means for discriminating whether the object field is indoors or outdoors and determines said distance to said object field in response to said first, second and third outputs and said location discriminating means.

14. A range measuring device for use in a camera, comprising:
   means for measuring the distance to an object field;
   location detecting means for discriminating whether the object field is indoors or outdoors;
   means for predetermining a reference distance range obtaining a high probability of existence of a primary object therein, in accordance with a discrimination of said location detecting means; and
   means for evaluating said distance measured by said measuring means on the basis of said reference distance range.

15. A device according to claim 14, wherein said measuring means measures distances to a plurality of areas, respectively, of said object field, and said evaluating means determines the distance to said object field on the basis of said distances to said areas and said reference distance range.

* * * * *